United States Patent Office 3,600,434
Patented Aug. 17, 1971

3,600,434
HALIDE ADDITION PROCESS
Frederick F. Rust, Orinda, and Harvey S. Klein, Berkeley, Calif., assignors to Shell Oil Company, New York, N.Y.
No Drawing. Original application Feb. 6, 1964, Ser. No. 343,136, now Patent No. 3,480,661, dated Nov. 25, 1969. Divided and this application May 29, 1969, Ser. No. 840,085
Int. Cl. C07c 67/00, 51/00, 45/00
U.S. Cl. 260—486H                    10 Claims

ABSTRACT OF THE DISCLOSURE

Halogenated carbonylic compounds are prepared by the addition of α-(di- to polyhalo) carbonylic compounds to olefins and dienes in the presence of a copper salt as catalyst.

This application is a division of copending application Ser. No. 343,136, filed Feb. 6, 1964, now U.S. Pat. No. 3,480,661.

This invention relates to an improved method for the production of certain halogenated carbonylic compounds. More particularly, it relates to an improved method for the addition of certain α-halo carbonylic compounds to olefins.

The peroxide-catalyzed addition of certain α-halo carbonylic compounds to olefins is known in the art. Kharasch et al., J. Am. Chem. Soc., 67, 1926 (1945), describe the addition of trichloroacetyl chloride and methyl dichloroacetate to octene-1 in the presence of acetyl peroxide. In the reaction of the completely halogenated acid chloride, cleavage of the bond between the α-carbon atom and a halogen substituent is apparently observed, as the product that results appears to arise from the addition of the moieties produced thereby to the ethylenic linkage of the unsaturate. When a similar procedure was employed to react methyl dichloroacetate with octene-1, however, the bond apparently broken was that between the α-carbon atom and the hydrogen substituent. The formation of α,α-dichlorodecanoic acid was observed, and the α-halogen substituents did not enter into the reaction. It therefore appears that the peroxide-catalyzed addition of α-halo carbonylic compounds is not entirely general, or is at least dependent upon the particular type of carbonylic compound employed or the number of α-halo substituents. It would be of advantage to provide a more general reaction process for the addition of α-halo carbonylic compounds to olefins.

It is an object of this invention to provide an improved method for the production of certain halogenated carbonylic compounds. More particularly, it is an object to provide an improved process for the addition of α-(di- to polyhalo) carbonylic compounds to organic molecules possessing ethylenic unsaturation.

It has now been found that these objects are accomplished by the process for the addition of α-halo carbonylic compounds which possess at least two halogen substituents upon at least one carbon atom which is attached to the carbon atom of a carbon-oxygen double bond, to an ethylenically unsaturated organic molecule in liquid-phase solution in inert solvent in the presence of certain metallic compounds as catalyst.

The metallic compounds which have been found to be useful catalysts in the process of the invention are copper compounds, particularly copper salts comprising copper cations, either in the cuprous or cupric oxidation state, and simple anions, either organic or inorganic. Although copper compounds such as the acetate, nitrate, sulfate and the like are operable, best results are obtained when the catalyst employed is a halide, e.g., fluoride, chloride, bromide or iodide. Preferred are copper halides wherein the halogen has an atomic number from 17 to 35, that is, the middle halogens chlorine and bromine. Although in general the cuprous salts are preferred over the corresponding cupric salt, in most cases cupric salts give satisfactory results. Particularly preferred as catalyst for the process of the invention is cuprous chloride.

The halogenated carbonylic compounds employed as reactants in the process of the invention are α-(di- to polyhalo) carbonylic compounds possessing at least two halogen substituents upon at least one carbon atom which is alpha to a carbonyl group, i.e., a carbon-oxygen double bond. Such compounds are typified by aldehydes, ketones, carboxylic acids, carboxylic acid anhydrides, carboxylic acid chlorides, carboxylic acid esters and carboxylic acid amides wherein at least one carbon atom alpha to a carbonyl group is substituted with at least two halogen substituents. Preferred α-halo carbonylic compounds are nonhydroxylic, are mono-carbonylic, that is, contain only a single carbon-oxygen double bond, and contain only atoms of carbon, hydrogen and halogen besides the oxygen atom(s) of the functional group containing the carbonylic moiety. One class of such halohydrocarbon carbonylic compounds contains from 2 to 12 carbon atoms and is represented by the formula

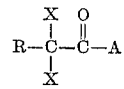

wherein X is halogen, e.g., fluorine, chlorine, bromine or iodine; R is X, hydrogen, alkyl or haloalkyl, generically designated (halo)alkyl, wherein the alkyl moiety has from 1 to 10 carbon atoms, preferably from 1 to 4; and A is R or alkoxy having from 1 to 10 carbon atoms, preferably 1 to 4. Preferred halogens in the above-depicted formula are halogens having an atomic number from 17 to 35, and most preferred is chlorine.

Exemplary compounds of the above-depicted formula include α-halo aldehydes such as dichloroacetaldehyde, chloral, α,α-dichloropropionaldehyde, α,α-dibromobutyraldehyde and α,α-dichlorovaleraldehyde; α-haloketones such as α,α-dichloroacetone, α,α,α'-tribromoacetone, hexachloroacetone, 1,1-dichlorobutanone, 3,3-dibromo-2-pentanone, 2,2-dichloro-3-hexanone, pentabromoacetone, 4,4-dichloro-3-octanone and 3,3-dichlorobutanone; α-halo carboxylic acid chlorides such as trichloroacetyl chloride, dibromoacetyl bromide, 2,2-dichloropropionyl chloride, α,α-dichlorobutyryl chloride, 2,2-dibromohexanoyl bromide and tribromoacetyl bromide; and α-halo carboxylic acid esters such as methyl dichloroacetate, ethyl trichloroacetate, methyl 2,2-dibromopropionate, butyl tribromoacetate, propyl 2,2-dichlorohexanoate, methyl trichloroacetate and methyl 2,2-dichloropentanoate.

The olefin reactant contains one or more ethylenic linkages, i.e., non-aromatic carbon-carbon double bonds, but is preferably free from acetylenic unsaturation. The olefin is cyclic or acyclic, and is wholly aliphatic or may contain aromatic moieties. Suitable olefins have from 2 to 20 carbon atoms, preferably 2 to 12, and have from 1 to 2 ethylenic linkages which may be isolated, that is, not conjugated with non-aromatic carbon-carbon unsaturation, or may be conjugated when more than one olefinic linkage is present. Preferred olefins are activated olefins, which terminology is herein employed to indicate an olefin wherein at least one ethylenic linkage is conjugated with other non-aromatic unsaturation which may be carbon-carbon, i.e., ethylentic, or non-carbon-carbon. By non-carbon-carbon unsaturation is meant a multiple bond between two atoms at least one of which is not carbon.

Illustrative of such activated olefins are conjugated dienes, α,β-ethylenically unsaturated nitriles, α,β-ethylenically unsaturated esters, α,β-ethylenically unsaturated aldehydes and the like, although it is preferred to employ activated olefins wherein the ethylenic linkage is conjugated with other ethylenic unsaturation, the nitrile group or the carboalkoxy, i.e., ester, group wherein the alkyl moiety has from 1 to 8 carbon atoms. The olefin is hydrocarbon or may contain non-hydrocarbyl moieties such as halogen, particularly halogen of atomic number from 17 to 35, acyloxy, carboalkoxy or nitrile substituents, which substituents are not detrimental to the process of the invention, but preferably is non-hydroxylic. Preferred are olefins which are hydrocarbon or contain as the only additional atoms, i.e., non-hydrocarbyl moieties, nitrile nitrogen atoms or carbonyloxy oxygen atoms.

Typical non-activated olefins include ethylene, propylene, 1-butene, isobutylene, hexene, decene, cyclohexene, cyclooctene, vinylbenzene, m-diallylbenzene, biallyl, 1,11-dodecadiene, 1,4-cyclohexadiene and 2,8-decadiene; while illustrative activated olefins include butadiene, isoprene, cyclopentadiene, 2,4-hexadiene, 1,3-cyclohexadiene, acrylonitrile, methacrylonitrile, crotonitrile, 2 - cyano - 3-hexene, methyl acrylate, octyl crotonate, ethyl 2 - hexenoate, butyl methacrylate and propyl cinnamate. In general, acyclic olefins are preferred over the analogous cyclic materials, and olefins wherein at least one ethylenic linkage is terminal are preferred over those olefins wherein each ethylenic linkage is internal. Particularly preferred are thos olefins which have from 3 to 7 carbon atoms and are conjugated dienes, α,β-ethylenically unsaturated nitriles or α,β-ethylenically unsaturated esters.

The most suitable molar ratio of reactants will in part depend upon the functionality of the reactants, that is, the number of alpha-carbon atoms which are at least dihalo substituted and the number of unsaturated reaction sites, i.e., the number of isolated ethylenic linkages or conjugated diene moieties present in the molecule, as it is within the contemplated scope of the reaction to combine reactant molecules in a ratio determined by the number of reactive groups present. For example, one molecule possessing two isolated ethylenic linkages may react with two molecules of α-halo carbonylic compound. Alternatively, a carbonylic compound possessing more than one halogen-substituted alpha-carbon atom, e.g., an α,α,α′,α′-tetrahaloketone, may react with more than one molecule of olefinic reactant. In general, molar ratios of halogen-substituted alpha-carbon atom to unsaturated reaction site from about 2:1 to about 1:2 are satisfactory, while frequently a molar ratio that is substantially stoichiometric, i.e., a ratio of about 1:1, is advantageously utilized.

The copper compound is employed in catalytic amounts. While the optimum amount of catalyst will depend upon the particular α-halo carbonylic compound, olefin and copper compound employed, amounts of catalyst from about 0.005 mole to about 0.5 mole per mole of limiting reactant are generally satisfactory, while amounts of catalyst from about 0.05 mole to about 0.2 mole per mole of limiting reactant are preferred.

The process of the invention is conducted in liquid-phase solution in an inert solvent. Solvents that are suitable are liquid at reaction temperature and pressure, are capable of dissolving the reactants and are substantially inert toward the α-halo carbonylic compound and the olefinic reactants as well as the products produced therefrom. Preferred solvents are polar, that is, contain uneven charge distribution, and include such solvents as the alcohols, particularly lower monohydric and polyhydric alkanols such as methanol, ethanol, sec-butanol, tert-butanol, 2-ethylhexanol, glycerol, ethylene glycol and 1,2,6-hexantriol as well as the ether alcohols such as the Cellosolves and the Carbitols; the lower alkyl nitriles such as acetonitrile, propionitrile and butyronitrile; esters such as methyl acetate, ethyl propionate, methyl butyrate and butyl acetate; sulfones such as diethyl sulfone, propyl hexyl sulfone and sulfolane; and N,N-dialkylamides such as dimethylformamide and N,N-diethylacetamide. Most satisfactory solvents comprise the nitriles, especially the cyanoalkanes, and particularly preferred as reaction solvent is acetonitrile.

The solvent is employed in molar amounts equivalent to or in excess over either reactant. While a large excess of solvent does not appear to be overly detrimental, molar ratios of solvent to limiting reactant from about 1:1 to about 20:1 are preferred.

The reaction process is conducted at atmospheric, subatmospheric or superatmospheric pressure, so long as the reactants are maintained in the liquid phase. Advantageous use is frequently made of the pressures generated when the reaction mixture is heated to reaction temperature in a sealed vessel. Such pressures will be somewhat but not substantially higher than atmospheric pressure. Suitable reaction temperatures for the process of the invention vary from about 60° C. to about 200° C., although temperatures from about 80° C. to about 160° C. are preferred.

The process of the invention is conducted by mixing the reactants, catalyst and solvent and maintaining the reaction mixture at the desired temperature until reaction is complete. The method of mixing is not material. One reactant may be added to the other in increments, although it is equivalently useful to initially mix the entire amounts of reactants. Subsequent to reaction, the product mixture is separated by conventional means such as fractional distillation, selective extraction or crystallization.

The products of the invention are halogen-substituted carbonylic compounds illustratively produced by cleavage of the bond between an alpha-carbon and a halogen substituent thereof and subsequent addition of the moieties thereby produced to the unsaturated reaction site. When the unsaturated reaction site is an isolated ethylenic linkage, addition of the moieties of the α-halo carbonylic compound occurs in a 1,2 manner as is illustrated by the equation below.

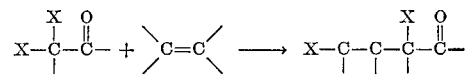

Alternatively, when the unsaturated reaction site comprises a conjugated diene moiety, addition predominantly occurs in a 1,4 manner as illustrated by the following equation.

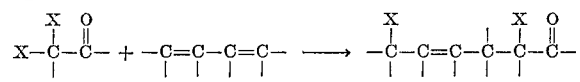

Illustrative of typical products produced by the process of the invention are methyl 2,2,6-trichloro-4-hexenoate,
2,2,4-tribromobutyraldehyde,
3,7-dichloro-5-hepten-2-one,
ethyl 2-chloro-2-(2-chlorocyclohexyl)ethanoate,
1,3,3,5,7-hexachloro-4-heptanone,
2,2,6-trichloro-5-methyl-4-hexenoyl chloride,
methyl 2,4,5,6-tetrabromo-4-hexenoate,
propyl 4-cyano-2,4-dichlorobutanoate,
diethyl 2,2,4-tribromoadipate and
1,7-dicyano-1,3,5,7-tetrachloro-4-heptanone.

Because of the number and variety of functional groups present in the products of the invention, the products are extremely useful as chemical intermediates. The halogen substituents of the molecule may be reacted with tertiary amines to produce useful quaternary ammonium salts, or hydrolyzed to the corresponding alcohols from which useful esters or ethers may be produced. In certain products of the invention, the ethylenic linkage that remains may serve as a reactive site for polymerization or copolymerization, or alternatively may be epoxidized to form useful epoxy resin precursors. In addition, of course, the functional group of the initial α-halo carbonylic compound remains intact and suitable for conversion to conventional derivatives.

Among particular utilities of the process of the invention is the cross-linking of polydiene elastomers by reaction of the ethylenic linkages remaining therein with a carbonylic compound possessing more than one halogen-substituted alpha-carbon atom, and also in the production of amino acids. For example, a dichloroacetate is added to butadiene to produce a 2,6-dichloro-4-hexenoate which is converted by steps of ammonolysis, hydrogenation and hydrolysis to lysine. In addition, the products of the process of the invention are useful in the area of agricultural chemicals, where, for example, they are particularly useful as precursors of insecticides and the like.

To further illustrate the process of the invention, the following examples are provided. It should be understood that they are not to be regarded as limitations, as the teachings thereof may be varied as will be understood by one skilled in this art.

EXAMPLE I

To a glass tube was charged 7.0 g. of methyl dichloroacetate, 3.0 g. of acrylonitrile, 0.5 g. of cuprous chloride and 12 ml. of acetonitrile. The tube was sealed and the reaction mixture was maintained at 130° C. for 19 hours. The tube was cooled and opened, the contents were washed with water and resulting organic phase was dried over magnesium sulfate. Gas-liquid chromatographic analysis indicated the product, methyl 4-cyano-2,4-dichlorobutanoate, B.P. 250° C., $n_D^{25}$ 1.4670, was produced in an essentially theoretical yield based upon a conversion of 25%.

*Analysis.*—Calcd. (weight percent): C, 36.8; H, 3.6; Cl, 7.1. Found (weight percent): C, 36.4; H, 3.5; Cl, 6.9.

EXAMPLE II

To a glass tube was charged 12.15 g. of hexachloroacetone, 5.3 g. of butadiene, 1 g. of cuprous chloride and 20 ml. of acetonitrile. The reaction mixture was maintained at 90° C. for 1.5 hours. Upon washing the product mixture with water and drying the organic phase over magnesium sulfate, a yield of 15.28 g. of 1,5,5,7,7,11-hexachloroundeca-2,9-dien-6-one, $n_D^{25}$ 1.5266, was obtained.

Similar results are obtained when cupric chloride is employed as catalyst.

EXAMPLE III

By a procedure similar to that of Examples I, 2.5 g. of ethyl trichloroacetate was heated with 1 g. of pentene-2 in the pressure of 0.2 g. of cuprous chloride and 3 ml. of acetonitrile at 85° C. for 24 hours. A 90% yield, based upon a 19% conversion, of a mixture of the isomeric products ethyl 2,2,4-trichloro-3-methylhexanoate and ethyl 2,2,4-trichloro-3-ethylpentanoate was obtained.

EXAMPLE IV

When methyl 2,2-dibromopropanoate is reacted with ethylene in dimethylformamide solution in the presence of a catalytic amount of cuprous bromide, a good yield of 2,4-dibromo-2-methylbutanoate is obtained.

EXAMPLE V

When the procedure of Example I is followed to react trichloroacetyl chloride with butadiene, a good yield of 2,2,6-trichloro butenoyl chloride is obtained.

EXAMPLE VI

When chloral is reached with 2,3-dimethylbutadiene in the presence of cuprous chloride in acetonitrile solution, a good yield of 4,5-dimethyl-2,2,6-trichloro-4-hexenal is obtained.

EXAMPLE VII

When a procedure similar to that of Example I is followed to react ethyl dibromoacetate with ethyl acrylate in the presence of a catalytic amount of cuprous bromide, a good yield of diethyl 2,4-dibromoglutarate is obtained.

We claim as our invention:

1. The process for the production of halogenated carbonylic compounds by the addition of halohydrocarbon carbonylic compounds represented by the formula

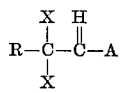

wherein X is halogen of atomic number of from 17 to 35, R is X, hydrogen, alkyl of from 1 to 10 carbon atoms or haloalkyl of from 1 to 10 carbon atoms wherein the halogen is halogen of atomic number of from 17 to 35, A is R or alkoxy of from 1 to 10 carbon atoms, to the ethylenic unsaturation of a nonacetylenic, hydrocarbyol olefinic reactant having from 2 to 20 carbon atoms and from 1 to 2 ethylenic linkages, in liquid phase solution in inert solvent, the molar ratio of said olefinic reactant to said halohydrocarbon carbonylic compound being from about 2:1 to about 1:2, at a temperature of from about 60° C. to about 200° C., in the presence of from about 0.005 mole to about 0.5 mole per mole of limiting reactant of a copper halide wherein the halogen has an atomic number of from 17 to 35.

2. The process of claim 1 wherein the copper halide is a cuprous halide and the olefinic reactant is an aliphatic conjugated diene having from 4 to 12 carbon atoms.

3. The process of claim 2 wherein X is chlorine, A is alkoxy and the cuprous halide is cuprous chloride.

4. The process of claim 3 wherein the halohydrocarbon carbonylic compound is alkyl di- to trichloroacetate wherein the alkyl moiety has from 1 to 4 carbon atoms.

5. The process of claim 4 wherein the olefinic reactant is 1,3-butadiene.

6. The process of claim 4 said alkyl chloroacetate is alkyl dichloroacetate.

7. The process of claim 2 wherein A is alkyl or haloalkyl, X is chlorine and the cuprous halide is cuprous chloride.

8. The process of claim 7 wherein the halohydrocarbon carbonylic compound is di- to hexachloroacetone.

9. The process of claim 8 wherein the olefinic reactant is 1,3-butadiene.

10. The process of claim 8 wherein the halohydrocarbon carbonylic compound is hexachloroacetone.

References Cited

UNITED STATES PATENTS 3,329,707   7/1967   Klein et al. _____ 160—487

LEWIS GOTTS, Primary Examiner

J. L. DAVISON, Assistant Examiner

U.S. Cl. X.R.

260—405.5, 408, 468R, 485F, 485H, 487, 534L, 544F, 544Y, 597R, 604R